(12) United States Patent
Yamada (10) Patent No.: US 10,737,653 B2
(45) Date of Patent: Aug. 11, 2020

(54) AIRBAG MOUNTING STRUCTURE AND AIRBAG MOUNTING METHOD

(71) Applicant: CALSONIC KANSEI CORPORATION, Saitama (JP)

(72) Inventor: Tomiharu Yamada, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 97 days.

(21) Appl. No.: 15/541,851

(22) PCT Filed: Dec. 22, 2015

(86) PCT No.: PCT/JP2015/085805
§ 371 (c)(1),
(2) Date: Jul. 6, 2017

(87) PCT Pub. No.: WO2016/111166
PCT Pub. Date: Jul. 14, 2016

(65) Prior Publication Data
US 2018/0001856 A1 Jan. 4, 2018

(30) Foreign Application Priority Data

Jan. 9, 2015 (JP) ................................. 2015-003456

(51) Int. Cl.
| | | |
|---|---|---|
| *B60R 21/205* | (2011.01) | |
| *B60K 37/00* | (2006.01) | |
| *B60K 35/00* | (2006.01) | |
| *B29C 65/00* | (2006.01) | |
| *B29C 65/06* | (2006.01) | |

(Continued)

(52) U.S. Cl.
CPC ............ *B60R 21/205* (2013.01); *B29C 65/06* (2013.01); *B29C 65/0618* (2013.01);
(Continued)

(58) Field of Classification Search
CPC . B60R 21/205; B60R 21/215; B29C 65/7814; B29C 66/30223; B29C 66/532;
(Continued)

(56) References Cited

U.S. PATENT DOCUMENTS 6,929,280 B2 * 8/2005 Yasuda .................. B29C 65/06
280/728.2
7,118,123 B2 * 10/2006 Weissert ............... B60R 21/216
280/728.3
(Continued)

FOREIGN PATENT DOCUMENTS

| CN | 1578723 | 2/2005 |
|---|---|---|
| CN | 101289003 | 10/2008 |

(Continued)

OTHER PUBLICATIONS

International Search Report dated Mar. 22, 2016 in International (PCT) Application No. PCT/JP2015/085805.

*Primary Examiner* — Paul N Dickson
*Assistant Examiner* — Timothy Wilhelm
(74) *Attorney, Agent, or Firm* — Wenderoth, Lind & Ponack, L.L.P.

(57) ABSTRACT

Side portions of a guide member mounting portion of the instrument panel include a panel side welding guide surface integrally formed therewith. The panel side welding guide surface is spaced apart from the back surface of the instrument panel. Side portions of the guide member include a guide side welding guide surface integrally formed with the guide member. The panel side welding guide surface and the guide side welding guide surface overlap each other. One of the guide side welding guide surface and the panel side welding guide surface includes a position regulating recess. The other of the guide side welding guide surface and the panel side welding guide surface includes a position regulating protrusion that fits into the position regulating recess during vibration welding.

1 Claim, 7 Drawing Sheets

(51) Int. Cl.
  *B29C 65/78* (2006.01)
  *B60R 21/215* (2011.01)
  *B29L 31/30* (2006.01)
  *B29L 22/02* (2006.01)

(52) U.S. Cl.
  CPC ...... *B29C 65/7814* (2013.01); *B29C 66/1122* (2013.01); *B29C 66/30223* (2013.01); *B29C 66/532* (2013.01); *B60K 35/00* (2013.01); *B60K 37/00* (2013.01); *B60R 21/215* (2013.01); *B29C 66/8322* (2013.01); *B29L 2022/027* (2013.01); *B29L 2031/30* (2013.01); *B29L 2031/3008* (2013.01); *B29L 2031/3038* (2013.01)

(58) Field of Classification Search
  CPC . B29C 66/1122; B29C 65/06; B29C 65/0618; B29C 66/8322; B60K 37/00; B60K 35/00; B29L 2022/027; B29L 2031/3038; B29L 2031/30; B29L 2031/3008
  See application file for complete search history.

(56) References Cited

U.S. PATENT DOCUMENTS

| | | | | |
|---|---|---|---|---|
| 7,320,820 B2* | 1/2008 | Shiono | ................ | B29C 65/0618 156/73.5 |
| 7,380,814 B2* | 6/2008 | Preisler | ............... | B60R 21/2165 280/728.3 |
| 7,744,115 B2* | 6/2010 | Kanno | .................. | B60R 21/205 280/728.2 |
| 7,784,820 B2* | 8/2010 | Mazzocchi | ........... | B60R 21/215 156/73.5 |
| 7,823,910 B2* | 11/2010 | Kanno | .................. | B29C 45/006 280/728.3 |
| 8,181,987 B2* | 5/2012 | Mazzocchi | ........... | B60R 21/215 280/728.2 |
| 8,336,908 B1* | 12/2012 | Kalisz | .................. | B60R 21/205 280/728.3 |
| 9,421,936 B2* | 8/2016 | Sugawara | ............. | B60R 21/215 |
| 2005/0064133 A1 | 3/2005 | Shiono | | |
| 2005/0269804 A1* | 12/2005 | Yamada | .................. | B29C 65/06 280/728.3 |
| 2007/0200273 A1 | 8/2007 | Shiono | | |
| 2008/0258439 A1* | 10/2008 | Kanno | .................. | B29C 45/006 280/728.3 |
| 2014/0203540 A1 | 7/2014 | Edeline | | |

FOREIGN PATENT DOCUMENTS

| | | |
|---|---|---|
| CN | 203623589 | 6/2014 |
| CN | 203766695 | 8/2014 |
| JP | 2004-90697 | 3/2004 |
| JP | 2007-7968 | 1/2007 |
| JP | 2013-151239 | 8/2013 |
| JP | 2014-162174 | 9/2014 |

* cited by examiner

AIRBAG MOUNTING STRUCTURE AND AIRBAG MOUNTING METHOD

TECHNICAL FIELD

The present invention relates to an airbag mounting structure and a method for mounting an airbag. This application is based upon and claims the benefit of priority from Japanese Patent Application No. 2015-003456 filed to the Japan Patent Office on Jan. 9, 2015, the entire disclosure of which is incorporated herein by reference.

BACKGROUND ART

A vehicle such as an automobile includes an instrument panel that is provided in a front portion of a vehicle cabin. An airbag system is provided in a passenger seat side of the instrument panel as a safety device to protect a passenger in a front passenger seat in case of emergency.

The airbag system for the front passenger seat includes an airbag module, an airbag lid, and a guide member. The airbag module houses an airbag body that is in the form of a bag and is folded when housed in the airbag module. The airbag lid is provided above the airbag module. The guide member is configured to mount the airbag module to the airbag lid (see Patent Literature 1, for example).

In an exemplary structure (an airbag mounting structure) for mounting the airbag module to the airbag lid, it is known that the guide member is placed to abut on a guide member mounting portion that is provided on the back side of the airbag lid, and the guide member and the guide member mounting portion are fixed or welded each other by vibration welding.

In the case where the guide member is fixed to the back side of the airbag lid, to improve the accuracy of the mounting position of the guide member is important for the deployment performance of the airbag system. Therefore, in Patent Literature 1 and the like, positioning ribs are provided in the circumference of the guide member mounting portion, which is on the back side of the airbag lid, to position the guide member.

CITATION LIST

Patent Literature

Patent Literature 1: JP 2007-7968 A

SUMMARY

Technical Problem

However, the airbag mounting structure has following problems. Specifically, when the instrument panel, which is a large component made of resin, is to be directly used as the airbag lid, it is difficult to dispose the positioning ribs in the front side of the vehicle longitudinal direction due to a demolding direction since the demolding direction of the instrument panel is restricted. Even if the positioning ribs are forcibly disposed in the front side of the vehicle longitudinal direction, the positioning ribs cannot be formed to have shapes effective for positioning, and therefore, it is difficult to fully exhibit the positioning function of the positioning ribs.

Accordingly, a main object of the present invention is to solve above problems.

Solution to Problem

An airbag mounting structure includes
an instrument panel that includes a guide member mounting portion disposed on a back side thereof; and
a guide member that mounts an airbag module to the instrument panel,
wherein the instrument panel and the guide member are fixed by vibration welding with the instrument panel and the guide member abutted each other;
wherein a side portion of the guide member mounting portion of the instrument panel includes a panel side welding guide surface that is integrally formed therewith and is spaced apart from the back side of the instrument panel;
wherein a side portion of the guide member includes a guide side welding guide surface that is integrally formed therewith and overlaps the panel side welding guide surface;
wherein one of the guide side welding guide surface and the panel side welding guide surface includes a position regulating recess; and
wherein the other of the guide side welding guide surface and the panel side welding guide surface includes a position regulating protrusion that fits into the position regulating recess during the vibration welding.

DESCRIPTION OF EMBODIMENTS

Hereinafter, an embodiment of the present invention is described in detail with reference to the drawings. FIGS. 1 to 10 are intended to illustrate the embodiment.

First Embodiment (Configuration) A configuration of the embodiment is described below. A vehicle such as an automobile includes an instrument panel 1 which is provided in a front portion of a vehicle cabin as shown in the vertical cross sectional view of FIG. 1 (see also the bottom view of FIG. 2). In a passenger seat side of the instrument panel 1, an airbag system 2 for a front passenger seat is provided as a safety device to protect a passenger in the front passenger seat in case of emergency.

Figure 1:
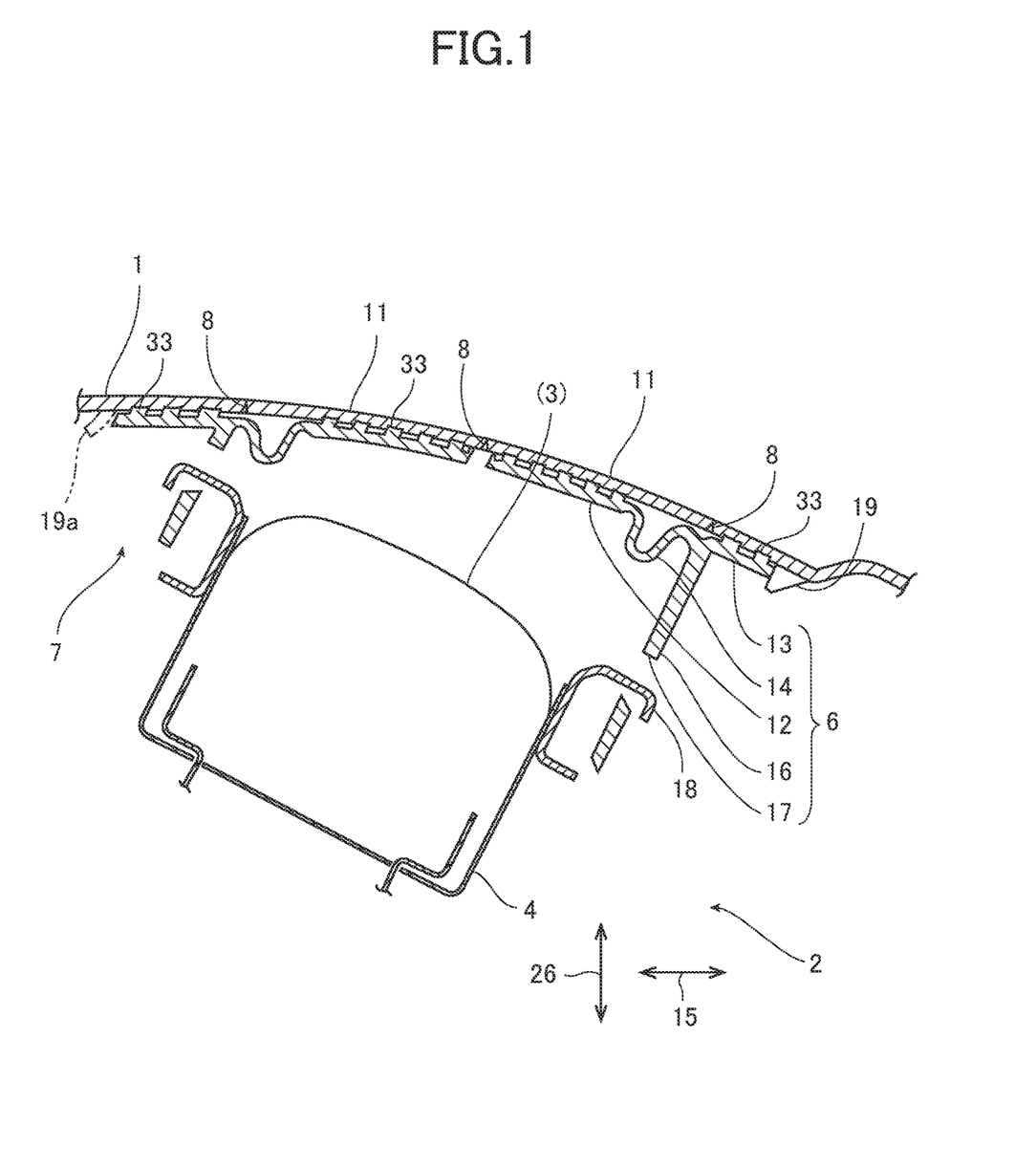
FIG. 1 is a vertical cross sectional view of an airbag mounting structure of an embodiment of the present invention.
Figure 2:
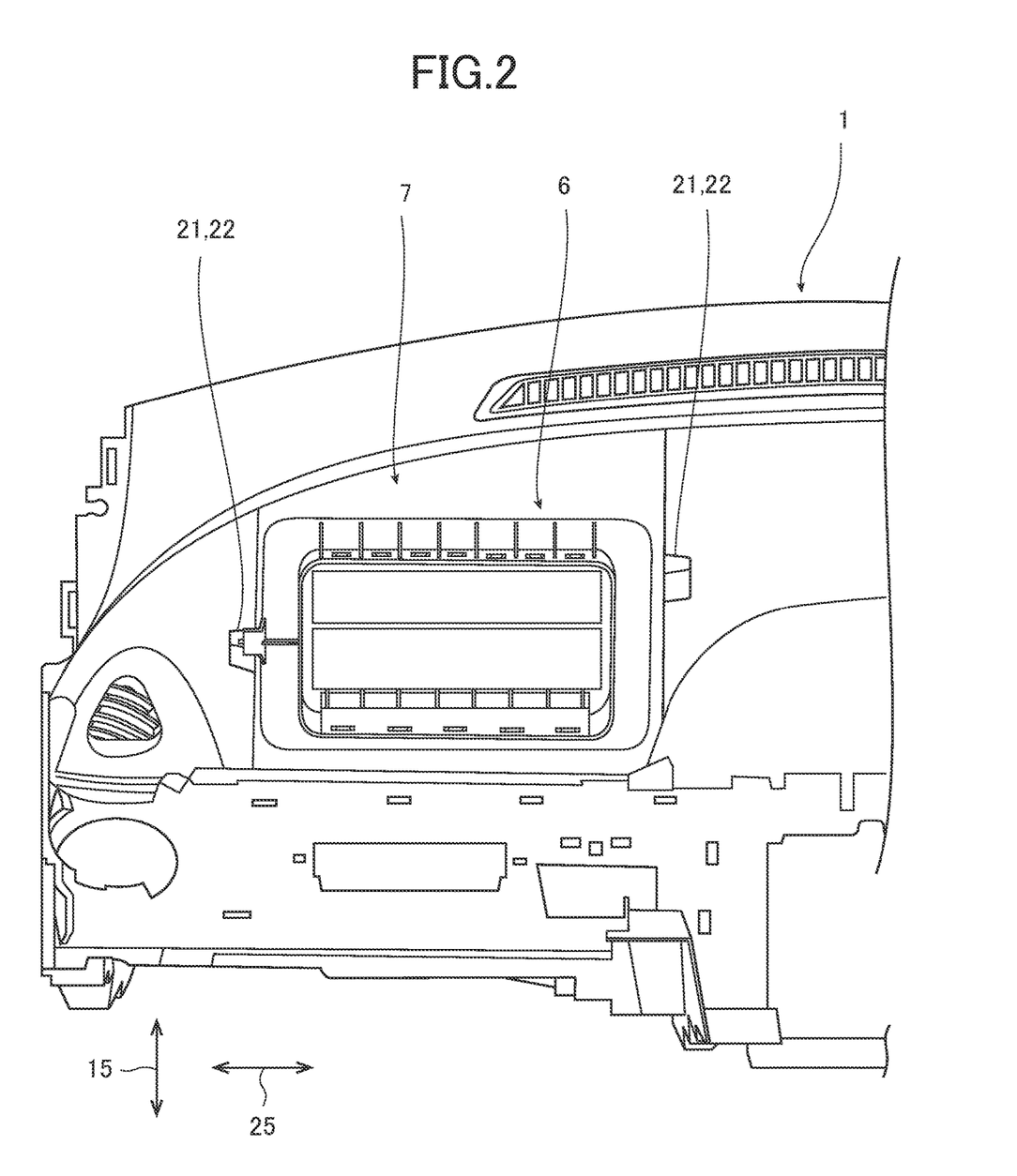
FIG. 2 is a bottom view of FIG. 1.

The airbag system 2 for the front passenger seat includes an airbag module 4, an airbag lid (the instrument panel 1 in this embodiment), and a guide member 6. The airbag module 4 houses an airbag body 3 which is in the form of a bag and is folded when housed in the airbag module 4. The airbag lid is provided above the airbag module 4. The guide member 6 is configured to mount the airbag module 4 to the airbag lid.

In this embodiment, the instrument panel 1, which is a large component made of resin, is used as the airbag lid. Note that the airbag lid may be formed as an independent element separate from the instrument panel 1 and mounted in an opening formed in the instrument panel 1. Hereinafter, a case where the instrument panel 1 is used as the airbag lid is described. However, with regard to a case where the airbag lid is formed as an independent element, a following description should be read by replacing the instrument panel 1 with the airbag lid.

Figure 3:
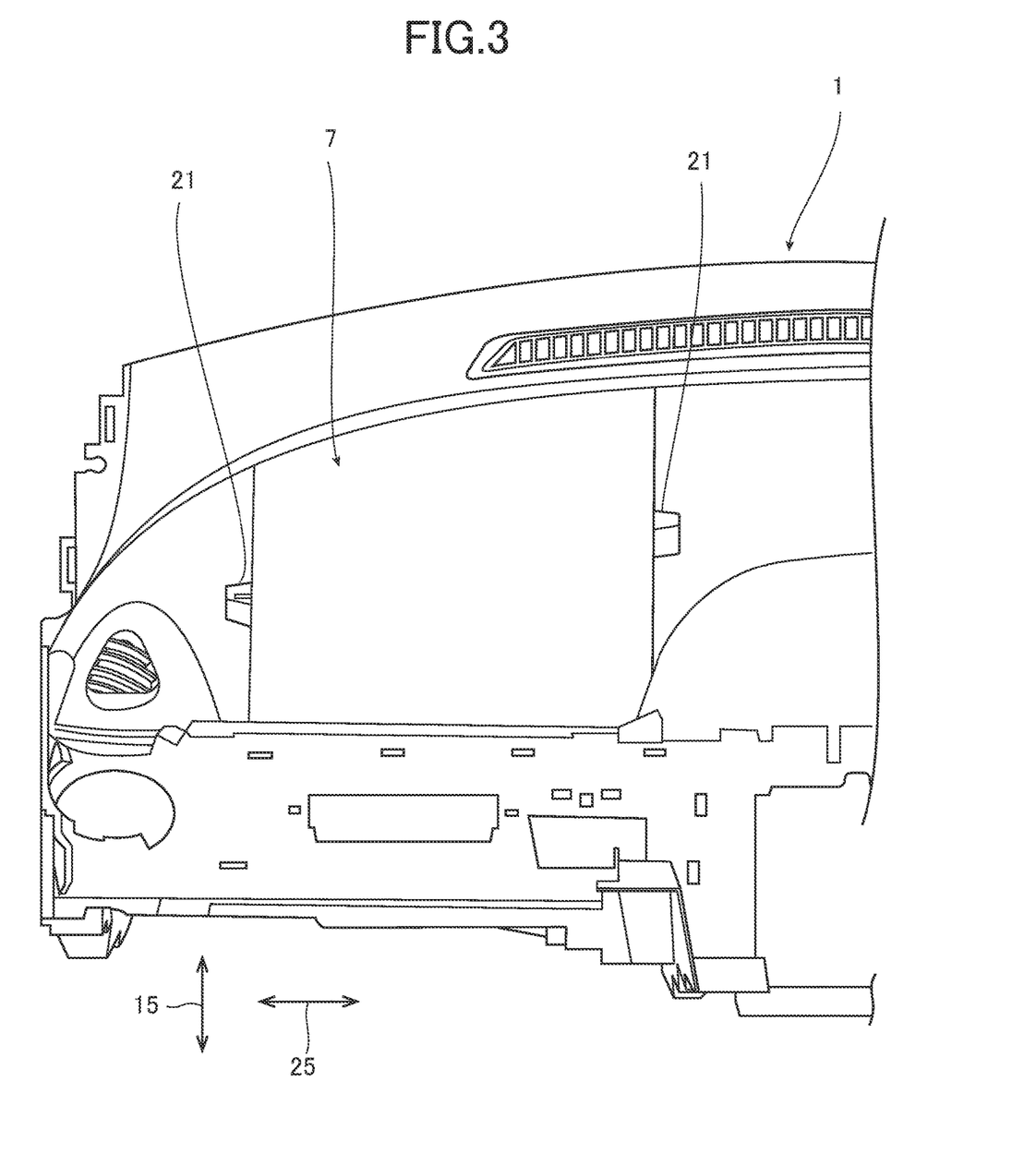
FIG. 3 is a bottom view of an instrument panel similar to FIG. 2.
Figure 4:
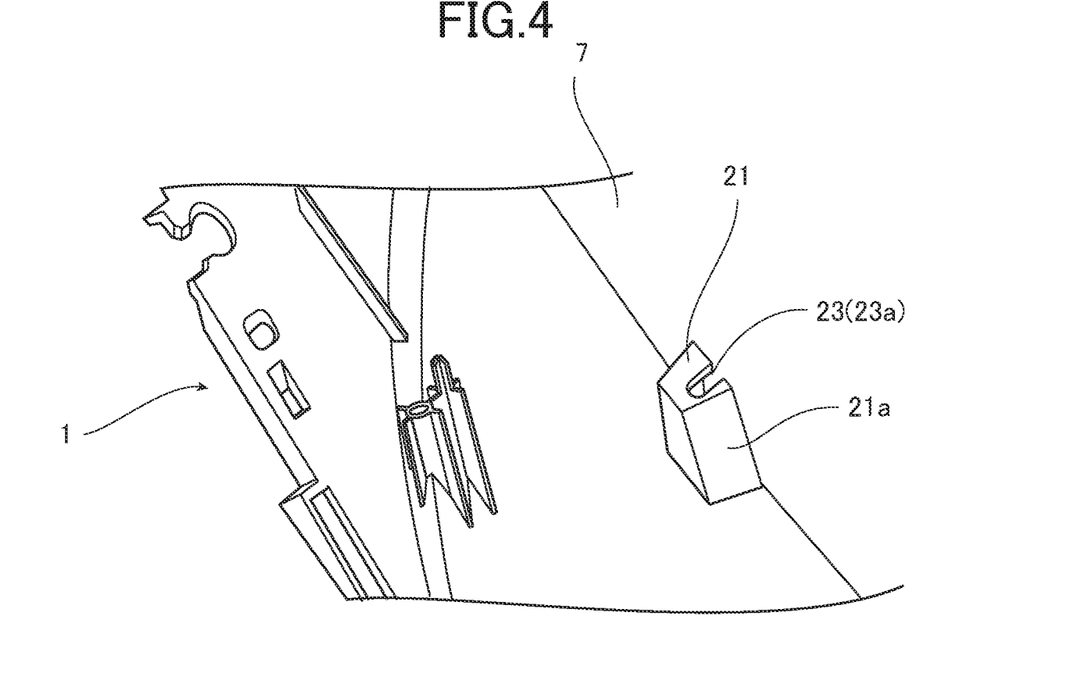
FIG. 4 is a partially enlarged perspective view of the instrument panel, illustrating a panel side welding guide surface.
Figure 5:
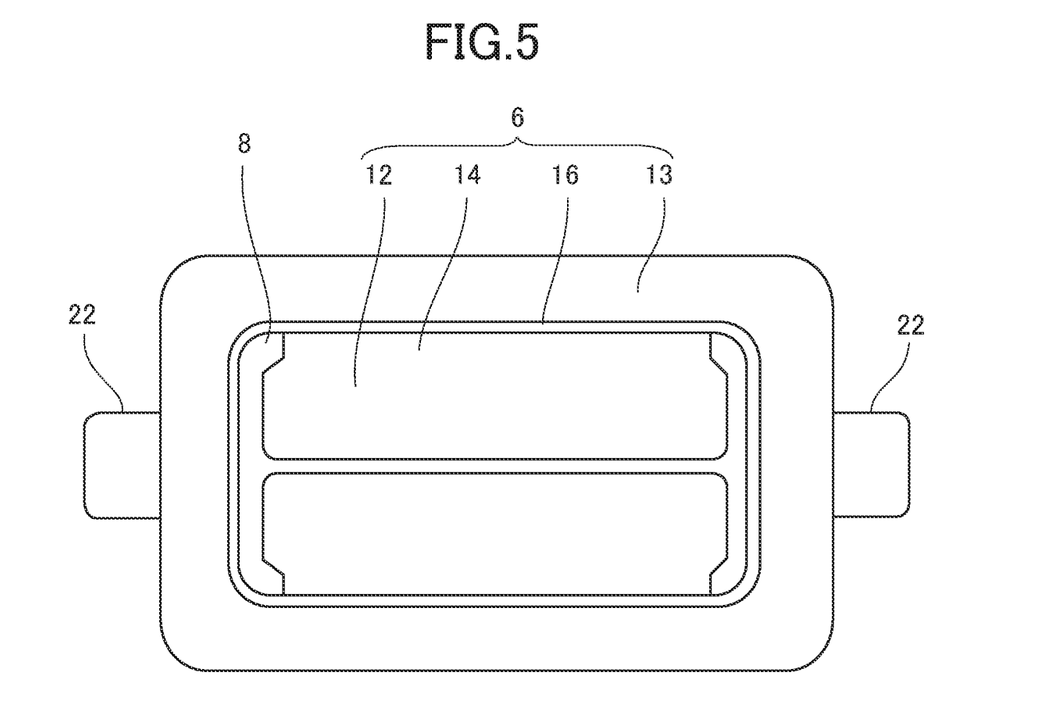
FIG. 5 is a bottom view of a guide member.
Figure 6:
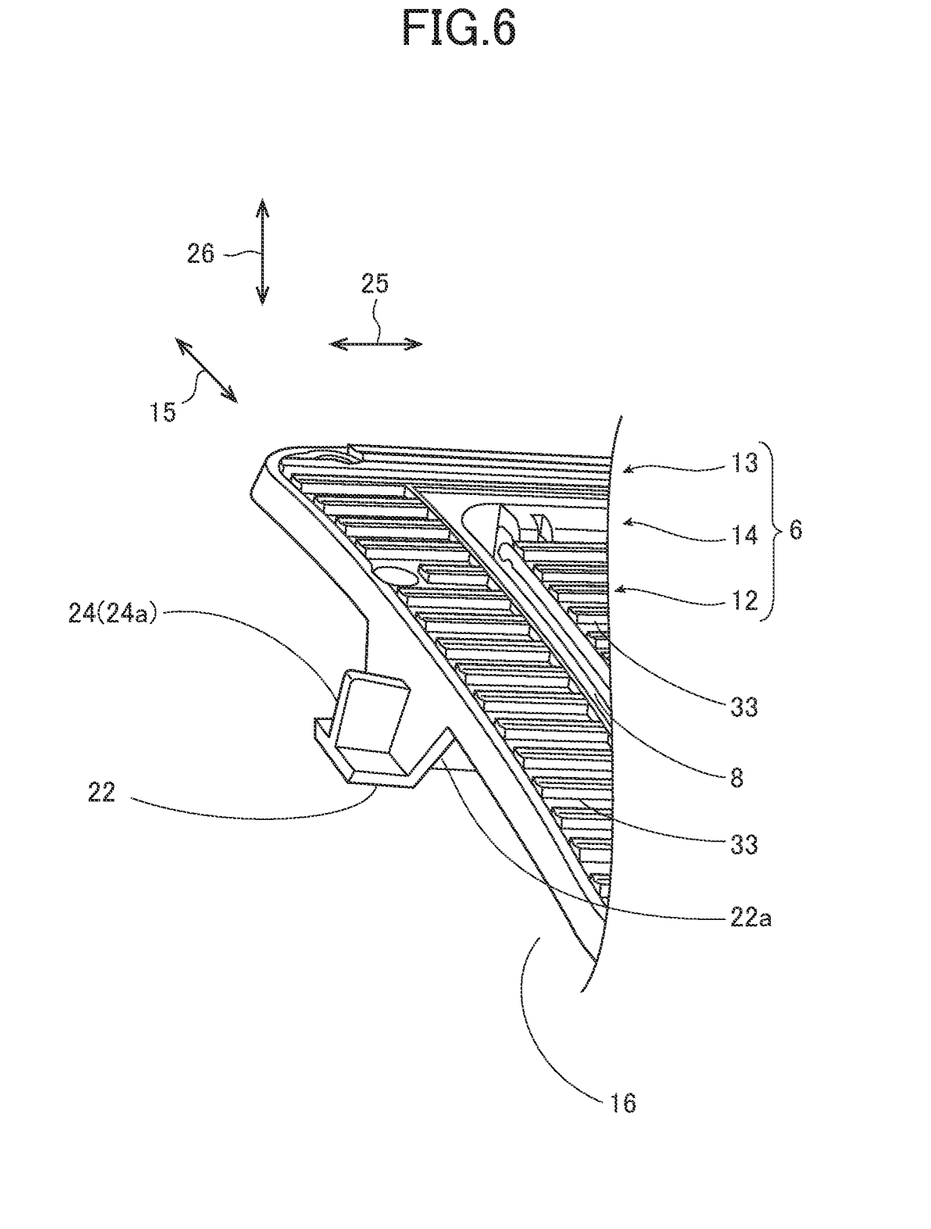
FIG. 6 is a partially enlarged perspective view of the guide member, illustrating the guide side welding guide surface.

As a mounting structure (an airbag mounting structure) that mounts the airbag module 4 to the instrument panel 1 (the airbag lid), the following mounting structure is adopted. Specifically, in the mounting structure, the instrument panel 1 including a guide member mounting portion 7 on the back side of the instrument panel 1 as shown in FIGS. 3, 4, and the guide member 6 for mounting the airbag module 4 to the instrument panel 1 as shown in FIGS. 5, 6. The guide member mounting portion 7 and the guide member 6 are placed to abut each other as shown in FIGS. 1, 2 and fixed or welded with vibration welding.

Here, the instrument panel 1 is configured as the airbag lid by forming cleavage lines 8 on the back side of the instrument panel 1. The cleavage lines 8 (i.e. breaking expected lines or fragile portions) are configured to cleave (break or rupture) with pressing force by the inflating airbag body 3 so as to provide an opening that allows the airbag body 3 to inflate and project toward a front passenger side of the vehicle cabin. The cleavage lines 8 have "H" shapes, "8" shapes, or the like in a plan view in a case where the instrument panel 1 (the airbag lid) is a double-door type, for example.

The guide member 6 includes a door portion 12, a mounting flange portion 13, a hinge portion 14, and a mounting leg portion 16. The door portion 12 reinforces a lid portion 11 formed inside of the cleavage lines 8. The mounting flange portion 13 surrounds the circumference of the door portion 12. The hinge portion 14 rotatably or turnably connects the door portion 12 to the mounting flange portion 13. The mounting leg portion 16 extends substantially obliquely forward and downward with regard to a vehicle longitudinal direction 15 from the inner circumferential edge of the mounting flange portion 13. The mounting leg portion 16 is configured in the form of a guide frame to guide the inflation and projection of the airbag body 3. The upper portion of the airbag module 4 is inserted within the mounting leg portion 16, and hook portions 18 disposed in the mounting leg portion 16 loosely fit into engaging holes 17 disposed in the mounting leg portion 16 to engage the airbag module 4 and the mounting leg portion 16 each other. In addition, the bottom portion of the airbag module 4 is fastened and fixed to a vehicle body.

The guide member mounting portion 7 is a region where the upper surface of the door portion 12, which is a movable portion, is fixed or welded to the lid portion 11 inside of the cleavage lines 8 with vibration welding, and the upper surface of the mounting flange portion 13, which is a fixed portion, is fixed or welded to portions outside of the cleavage lines 8. The guide member mounting portion 7 corresponds to the outer circumference of the mounting flange portion 13 or is larger than the outer circumference of the mounting flange portion 13. The upper surface of the door portion 12 and the upper surface of the mounting flange portion 13 include welding ribs 33 (mounting ribs), which are fixed portions for vibration welding. The welding ribs 33 are fixed to the back side of the lid portion 11 or the airbag lid by a vibration welding device or the like. Fixation by welding is made by fusing or combining the welding ribs 33, which are melted and softened with frictional heat generated by vibration, with the back side of the airbag lid or the lid portion 11. The rear side of the guide member mounting portion 7 in the vehicle longitudinal direction (right side in FIG. 1) may include positioning ribs 19 that are integrally formed therewith to restrict the movement of the guide member 6 in the vehicle longitudinal direction. Note that if the front side of the guide member mounting portion 7 in the vehicle longitudinal direction (left side in FIG. 1) is to be provided with positioning ribs 19a similar to the positioning ribs 19, it is difficult to restrict the movement of the guide member 6 in the vehicle longitudinal direction with the positioning ribs 19a since the positioning ribs 19a are formed obliquely forward and downward as shown in a virtual line due to the restriction of a demolding direction.

Figure 7:
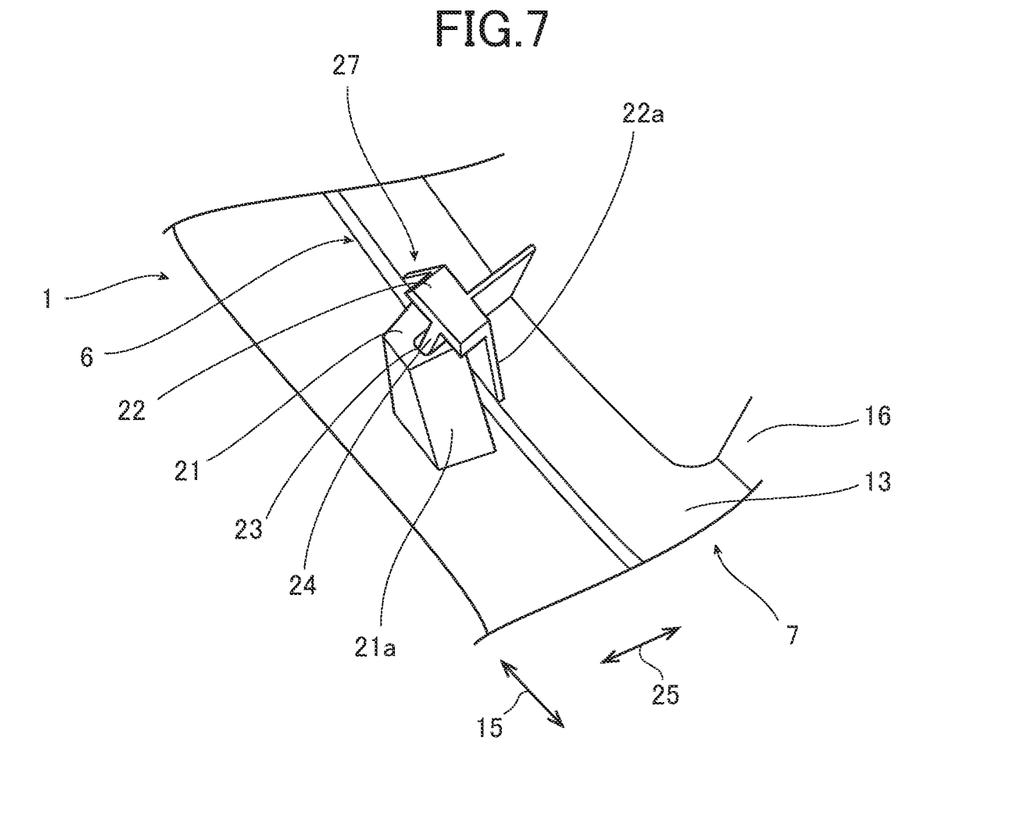
FIG. 7 is an enlarged perspective view similar to FIG. 4, illustrating an overlapping condition of the guide side welding guide surface and a panel side welding guide surface.
Figure 8:
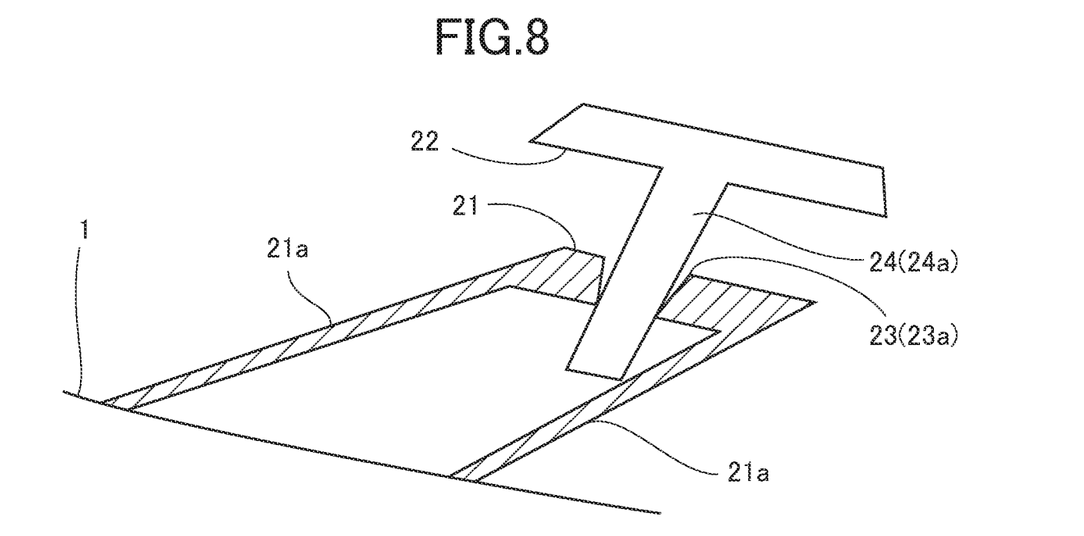
FIG. 8 is a cross sectional view of the panel side welding guide surface and the guide side welding guide surface of FIG. 7.

In this embodiment, the basic configuration described above further includes following elements. (1) As shown in FIG. 4, side portions of the guide member mounting portion 7 of the instrument panel 1 include a panel side welding guide surface 21 (panel side guide surface), respectively. The panel side welding guide surface 21 is integrally formed with each of the side portions of the guide member mounting portion 7 and spaced apart from the back surface of the instrument panel 1. As shown in FIGS. 5, 6, side portions of the guide member 6 include a guide side welding guide surface 22 (guide side guide surface), respectively. The guide side welding guide surface 22 is integrally formed with each of the side portions of the guide member 6. As shown in FIGS. 7, 8, the guide side welding guide surface 22 is placed to overlap the panel side welding guide surface 21. Further, one of the guide side welding guide surface 22 and the panel side welding guide surface 21 includes a position regulating recess 23. The other of the guide side welding guide surface 22 and the panel side welding guide surface 21 includes a position regulating protrusion 24. The position regulating protrusion 24 fits into the position regulating recess 23 during vibration welding.

Here, the side portions of the guide member mounting portion 7 are preferably side portions in a vehicle width direction 25. Preferably, the panel side welding guide surface 21 is substantially parallel to the instrument panel 1. The panel side welding guide surface 21 preferably includes side surface portions 21a. The side surface portions 21a connect the panel side welding guide surface 21 with the back surface of the instrument panel 1 to form a box portion in which at least one side is open, thereby ensuring strength required to the panel side welding guide surface 21. On the other hand, the side portions of the guide member 6 are preferably side portions of the mounting flange portion 13 in the vehicle width direction 25. Overlapping means to have portions at least slightly overlap each other (overlapping portion 27) in a vertical direction 26 at least during vibration welding. In this embodiment, when the guide member 6 is placed to abut on the guide member mounting portion 7 of the instrument panel 1, a part of the guide side welding guide surface 22 overlaps the bottom side of the panel side welding guide surface 21 (i.e. the top side of the panel side welding guide surface 21 since the welding guide surfaces 21, 22 are placed upside down as shown in FIGS. 7, 8 during assembling).

The guide side welding guide surface 22 is substantially parallel to the panel side welding guide surface 21. The guide side welding guide surface 22 may be a part of a box portion similar to that of the panel side welding guide surface 21. However, in this embodiment, the guide side welding guide surface 22 is connected by a vertical wall 22a which extends substantially downward from the mounting flange portion 13 along the side surface portions 21a of the panel side welding guide surface 21. The vertical wall 22a may include reinforcing ribs 22b if required (see FIGS. 9, 10). The position regulating recess 23 and the position regulating protrusion 24 are described below.

(2) Each of the position regulating recesses 23 extends in a vibration welding direction to allow the position regulating protrusion 24 to move in the vibration welding direction and to prevent the position regulating protrusion 24 from moving in a direction perpendicular to the vibration welding direction.

Figure 9:
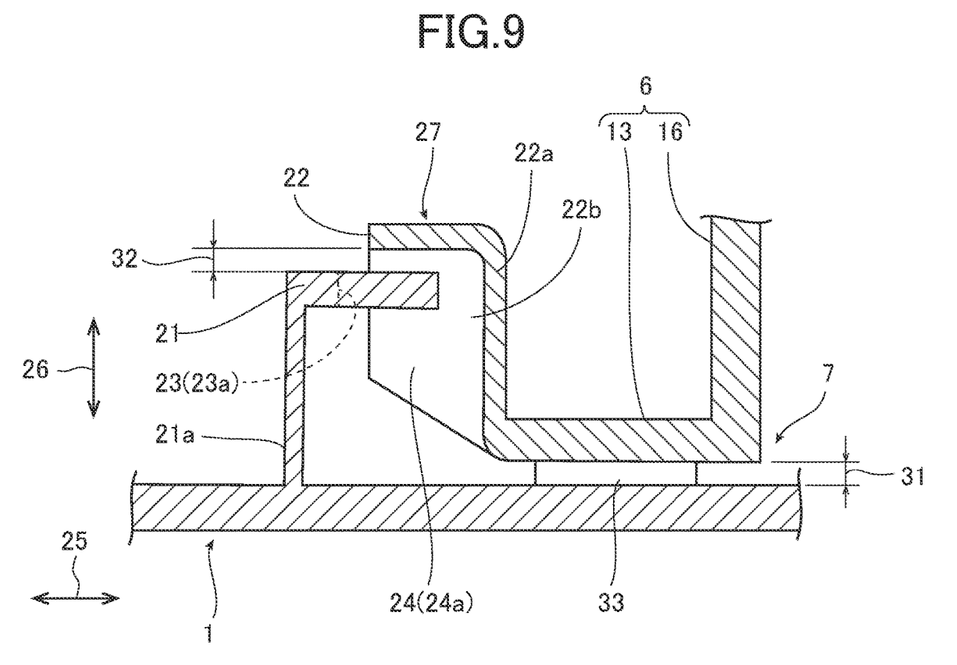
FIG. 9 is a vertical cross sectional view illustrating an example of a position regulating recess and a position regulating protrusion.
Figure 10:
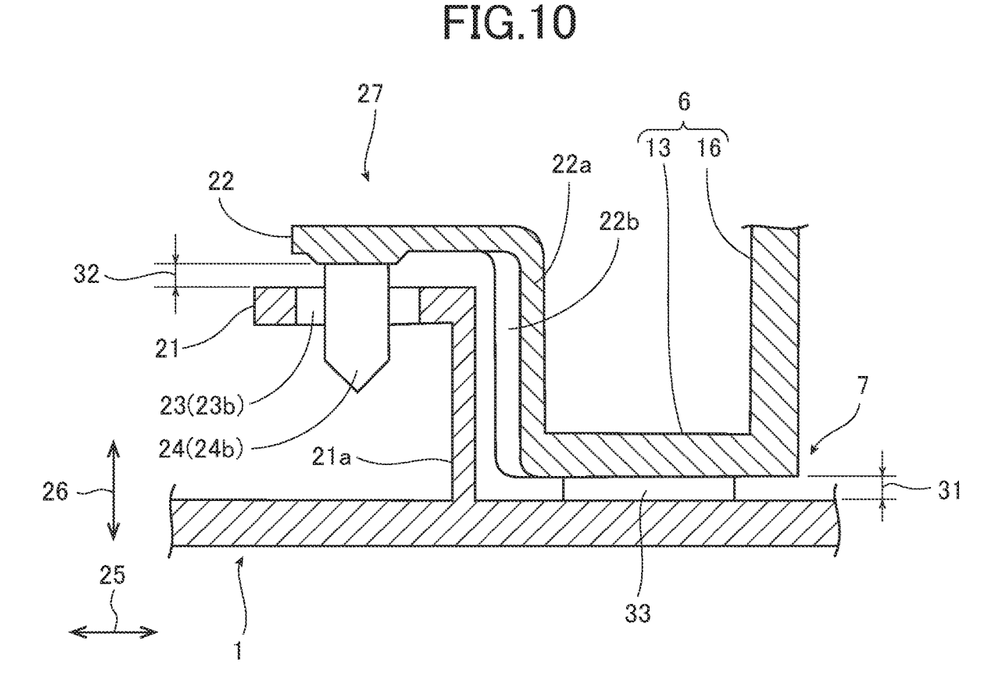
FIG. 10 is a vertical cross sectional view illustrating another example of a position regulating recess and a position regulating protrusion.

In this embodiment, the vibration welding direction corresponds to the vehicle width direction 25. The direction perpendicular to the vibration welding direction corresponds to the vehicle longitudinal direction 15. The position regulating recess 23 extending in the vibration welding direction may be a slit 23a (or an elongate groove) as shown in FIG. 9, an elongate hole 23b as shown in FIG. 10, or the like. On the other hand, the position regulating protrusion 24 may be a positioning rib 24a as shown in FIG. 9, a positioning pin 24b as shown in FIG. 10, or the like. Note that the combinations of the slit 23a, the elongate hole 23b, the positioning rib 24a, and the positioning pin 24b are not limited to the combinations described above.

Each of the position regulating recesses 23 is formed and/or processed in another step after forming the instrument panel 1. Accordingly, the position regulating recess 23 can be easily and reliably formed, while it is difficult to form the position regulating recess 23 with molding due to the structure of a mold. The process of the position regulating recess 23 may be performed with a cutting tool (a rotatable tool such as an end mill), or the like. When the position regulating recess 23 is processed with the cutting tool, the cross sectional shape of the position regulating recess 23 has a high probability of being narrowed as the recess 23 gets deeper (i.e. a tapered recess) as shown in FIG. 8 because of the shape of the cutting tool. In this case, it is preferable to position the position regulating protrusion 24 with regard to a deeper portion having a narrow width in the position regulating recess 23. In other words, the thickness of the position regulating protrusion 24 is set in accordance with the slit width of the deeper portion of the position regulating recess 23.

(3) As shown in FIGS. 9, 10, the overlapping portion 27 between the panel side welding guide surface 21 and the guide side welding guide surface 22 includes a clearance 32 that is equal to or greater than a vibration welding margin 31 (fixing margin).

Here, the vibration welding margin 31 is substantially equal to an extending amount of the welding ribs 33. The welding ribs 33 integrally stand relative to the upper surfaces of the door portion 12 and the mounting flange portion 13.

(4) The position regulating recess 23 is formed in the panel side welding guide surface 21. The position regulating protrusion 24 is formed in the guide side welding guide surface 22.

Here, the position regulating recess 23 is processed in the same step where the cleavage lines 8 are formed in the instrument panel 1. The cleavage lines 8 are processed with a hot blade, an ultrasonic cutter, a laser, for example. Accordingly, it is efficient to process the position regulating recess 23 with the hot blade, the ultrasonic cutter, the laser, or the like. When the position regulating recess 23 is processed with the cutting tool (e.g. the rotatable tool such as the end mill) as described above, it is efficient to simultaneously process the cleavage lines 8 with the same cutting tool. Even with any processing tools as described above, the process of the position regulating recess 23 is performed in the same step as the formation and process of the cleavage lines 8. Specifically, after the formation and process of the cleavage lines 8, the position regulating recess 23 is processed in the same step in accordance with actual positions of the formed cleavage lines 8. Since the formation of the cleavage lines 8 and the formation of the position regulating recess 23 are performed based on the same standard, the accuracy of the positions relative to each other can be improved. The guide member 6 is positioned by the position regulating recess 23 with a high degree of accuracy and then welded to the instrument panel 1. Accordingly, the accuracy of the mounting position of the guide member 6 relative to the cleavage lines 8 can be improved, and therefore, the deployment performance of the airbag system 2 can be improved. Note that the existing positioning ribs 19 are formed simultaneously with mold injection of the instrument panel 1, and the guide member 6 is fixed or welded to the instrument panel 1 with vibration welding after the cleavage lines 8 are formed. Therefore, in a case where positioning is performed based only on portions whose positions are preset as the existing positioning ribs 19, variations in positions caused by the formation of the cleavage lines 8 relative to the instrument panel 1, and variations in the mounting position of the guide member 6 relative to the cleavage lines 8 have to be considered. Accordingly, positioning only by the existing positioning ribs 19 lowers the positioning accuracy of the guide member 6 relative to the cleavage lines 8. On the other hand, in this embodiment, the position regulating recess 23 is formed after the formation and the process of the cleavage lines 8 based on the same standard. Accordingly, higher positioning accuracy relative to the guide member 6 can be obtained compared to the case where only the existing positioning ribs 19 are used.

Hereinafter, a method for mounting an airbag is described.

(5) In the method for mounting an airbag, the guide member 6 is placed to abut on the guide member mounting portion 7 formed on the back side of the instrument panel 1, and the guide member mounting portion 7 and the guide member 6 are fixed or welded each other with vibration welding. The guide side welding guide surface 22 that is integrally formed with the side portions of the guide member 6 is placed on the panel side welding guide surface 21 that is integrally formed with the side portions of the guide member mounting portion 7 of the instrument panel 1. The panel side welding guide surface 21 is spaced apart from the instrument panel 1. Then, vibration welding is performed with the position regulating protrusion 24 fitted into the position regulating recess 23. The position regulating protrusion 24 is formed on one of the panel side welding guide surface 21 and the guide side welding guide surface 22, and the position regulating recess 23 is formed on the other of the panel side welding guide surface 21 and the guide side welding guide surface 22.

As mentioned above, the instrument panel 1 and the guide member 6 are placed upside down during the above mounting. (6) The position regulating recess 23 is formed on the panel side welding guide surface 21. The position regulating recess 23 may be processed in the same step as a step of forming cleavage grooves (a cleavage groove forming step) in which the cleavage groove is formed and processed. The cleavage grooves define the lid portion 11 that is an opening expected portion relative to the back side of the instrument panel 1.

(Operation) The operation of the embodiment is described below. The instrument panel 1 and the guide member 6 are fixed or welded by reversing the instrument panel 1, by abutting the guide member 6, which is placed upside down, from above on the guide member mounting portion 7 formed on the back side of the instrument panel 1, and by performing vibration welding therewith. The airbag module 4 is mounted to the back side of the instrument panel 1 by retaining the airbag module 4 relative to the guide member 6 that is fixed to the instrument panel 1.

In case of emergency, the mounting leg portion 16 of the guide member 6 guides the airbag body 3, which is in the form of a bag, inflated and projected from the airbag module 4 so that the airbag body 3 is inflated and projected into the vehicle cabin. At this moment, pressing force of the inflated airbag body 3 acts on the lid portion 11 of the instrument panel 1 through the door portion 12 of the guide member 6, and accordingly, the cleavage lines 8 are cleaved or ruptured to open the lid portion 11. Thereby, the opening that allows the inflation and projection of the airbag body 3 is formed in the instrument panel 1. The airbag body 3 is inflated and projected toward the front passenger seat of the vehicle cabin through the opening. The airbag body 3 restrains and protects a body of a passenger who properly sits on the front passenger seat.

(Effect) According to the embodiment, following effects can be obtained. (1) In the case where the guide member 6 is fixed or welded to the back side of the instrument panel 1, it is important to improve the accuracy of the mounting position of the guide member 6 for the deployment performance of the airbag system 2. Conventionally, the positioning ribs 19 are disposed around the circumference of the guide member mounting portion 7 on the back side of the instrument panel 1, and the positioning ribs 19 directly position the guide member 6. However, the demolding direction of the instrument panel 1 is restricted, and accordingly, in relation to the demolding direction, it is difficult to dispose such positioning ribs 19a in the front side of the vehicle longitudinal direction. Even if the positioning ribs 19a are forcibly disposed in the front side of the vehicle longitudinal direction, the positioning ribs 19a cannot be formed to have shapes effective for positioning, and therefore, it is difficult to fully exhibit the positioning function of the positioning ribs 19a. In addition, as described above, it is difficult to improve the positioning accuracy with the positioning ribs 19a that are preformed in the instrument panel 1 in relation to the cleavage lines 8 that are postprocessed.

Considering above, the panel side welding guide surface 21 is provided on the side portions of the guide member mounting portion 7 of the instrument panel 1, and the guide side welding guide surface 22 is provided on the side portions of the guide member 6. The panel side welding guide surface 21 and the guide side welding guide surface 22 include the position regulating recess 23 and the position regulating protrusion 24, respectively. Thereby, positioning with the position regulating recess 23 and the position regulating protrusion 24 is indirectly performed via the panel side welding guide surface 21 and the guide side welding guide surface 22. Accordingly, position regulating members such as described above can be provided without being restricted by the demolding direction, and therefore, the positioning function (relative to required directions) of the position regulating recess 23 and the position regulating protrusion 24 can be fully exhibited. The higher positioning accuracy can be obtained compared to the case where only the existing positioning ribs 19 are used, since after forming and processing the cleavage lines 8, the position regulating recess 23 is processed based on the same standard.

(2) The position regulating recess 23 extends in the vibration welding direction. Accordingly, vibration welding can be well performed with the position regulating protrusion 24 fitted into the position regulating recess 23. In addition, positioning relative to the direction perpendicular to the vibration welding direction (i.e. the vehicle longitudinal direction 15 in this embodiment) can be reliably made without structural restrictions.

(3) The clearance 32, which is equal to or greater than the vibration welding margin 31, is provided in the overlapping portion 27 between the panel side welding guide surface 21 and the guide side welding guide surface 22. Accordingly, deterrent of vibration welding caused by the contact of the panel side welding guide surface 21 and the guide side welding guide surface 22 during vibration welding can be prevented. Resultingly, vibration welding can be reliably and steadily performed.

Because of the existence of the clearance 32, the position regulating recess 23 and the position regulating protrusion 24 can be well fitted each other without deforming the panel side welding guide surface 21 or the guide side welding guide surface 22 when the guide member 6 is placed to abut on the guide member mounting portion 7 on the back side of the instrument panel 1 for vibration welding. In addition, the fitting condition of the position regulating recess 23 and the position regulating protrusion 24 can be seen through the clearance 32, and easily and reliably determine whether the fitting condition is appropriate or not.

(4) The position regulating recess 23 is formed on the panel side welding guide surface 21, and the position regulating protrusion 24 is formed on the guide side welding guide surface 22. The position regulating recess 23 and the position regulating protrusion 24 may be placed vice versa. However, since the cleavage lines 8 are formed on the back side of the instrument panel 1 to form on the instrument panel 1 the opening that allows the inflation and projection of the airbag body 3 by pressing force generated when the airbag body 3, which is in the form of a bag, deploys, forming the position regulating recess 23 on the panel side welding guide surface 21 can make it possible to form the position regulating recess 23 simultaneously at the time of forming the cleavage lines 8, and therefore, processing steps are integrated to improve efficiency.

In addition, strength during the formation of the position regulating recess 23 can be easily secured by forming the panel side welding guide surface 21 to have a box shaped cross section as described above.

(5) According to the method for mounting an airbag in this embodiment, the operation and the effect same as the above can be obtained. (6) The position regulating recess 23 is formed on the panel side welding guide surface 21. In addition, the position regulating recess 23 may be processed in the same step as a step of forming cleavage grooves (a cleavage groove forming step) in which the cleavage groove is formed and processed. The cleavage grooves define the lid portion 11 which is the opening expected portion relative to the back side of the instrument panel 1. Accordingly, the position regulating recess 23 can be efficiently provided.

While the embodiments have been described in detail with reference to the drawings, the embodiments are only illustrative and exemplary of the invention. Accordingly, the invention is not limited to the configurations of the embodiments. It will be appreciated that any design change and the like that do not depart from the gist should be included in the invention. It is to be understood that, when multiple configurations are incorporated in each of the embodiments, for example, possible combinations of these configurations are included in the invention without any particular description. It should further be understood that, when multiple embodiments and modifications are disclosed as those of the invention, any possible combinations of configurations among these embodiments and modifications are considered to be included in the invention without any particular description. Moreover, configurations disclosed in the drawings are naturally considered to be included in the invention without any particular description. Further, the term "and/or the like (such as)" is used to indicate that any equivalent is also included. Also, when such a term as "substantially", "about", or "approximately" is used, this means that a value or the like within a range or accuracy which is reasonably acceptable is also included.

REFERENCE SIGNS LIST 1 instrument panel
4 airbag module
6 guide member
7 guide member mounting portion
15 vehicle longitudinal direction (vibration welding direction)
21 panel side welding guide surface
22 guide side welding guide surface
23 position regulating recess
24 position regulating protrusion
25 vehicle width direction (direction perpendicular to vibration welding direction)
27 overlapping portion
31 vibration welding margin
32 clearance

The invention claimed is:

1. A method for the preparation and mounting of an airbag wherein a guide member is placed to abut a guide member mounting portion formed on a back side of an instrument panel, and the guide member mounting portion and the guide member are fixed to each other with vibration welding, the instrument panel comprises a panel side welding guide surface that is integrally formed with a side portion of the guide member mounting portion and is spaced apart from the back side of the instrument panel, the instrument panel being made of resin, the panel side welding guide surface extends from the back side of the instrument panel and the guide member comprises a position regulating protrusion, the method comprising:

forming a cleavage line in the guide member mounting portion;

forming a position regulating recess on the panel side welding guide surface in accordance with actual position of the formed cleavage line, the panel side welding guide surface is supported by side surface portions along three sides thereof except for a side where the position regulating recess is provided in a plan view;

placing the position regulating protrusion into the position regulating recess; and performing the vibration welding with the position regulating protrusion fitted into the position regulating recess, wherein the position regulating recess is formed through the panel side welding guide surface by a cutting process, the position regulating recess is formed in the same cutting process as forming the cleavage line providing relative positioning.

* * * * *